United States Patent [19]

Ri

[11] Patent Number: 5,520,184
[45] Date of Patent: May 28, 1996

[54] ULTRASONIC DIAGNOSTIC METHOD AND AN ULTRASONIC DIAGNOSTIC APPARATUS FOR CARRYING OUT THE SAME

[75] Inventor: Taiho Ri, Tokyo, Japan

[73] Assignee: GE Yokogawa Medical Systems, Limited, Tokyo, Japan

[21] Appl. No.: 302,679

[22] PCT Filed: Mar. 29, 1993

[86] PCT No.: PCT/JP93/00384

§ 371 Date: Aug. 29, 1994

§ 102(e) Date: Aug. 29, 1994

[87] PCT Pub. No.: WO93/19674

PCT Pub. Date: Oct. 14, 1993

[30] Foreign Application Priority Data

Apr. 2, 1992 [JP] Japan .................................. 4-080740

[51] Int. Cl.⁶ ........................................................ A61B 8/00
[52] U.S. Cl. ............................................ 128/661.01; 73/626
[58] Field of Search ........................ 128/660.08, 661.01, 128/660.07; 73/625, 626

[56] References Cited

U.S. PATENT DOCUMENTS 4,497,322  2/1985  Nagasaki .............................. 128/660.01
4,779,622  10/1988  Nakamura ........................... 128/660.01

Primary Examiner—George Manuel
Attorney, Agent, or Firm—Moonray Kojima

[57] ABSTRACT

An ultrasonic diagnostic method and apparatus are provided for enhancing real-time performance, enlarging visual field, and improving S/N ratio without sacrificing any of real-time performance, visual field and S/N ratio by field into two or more sections; generating sounding waves forming a main lobe and grating lobes to scan the sections of the visual field respectively by the main lobe and the grating lobes; separately and directively processing an echo wave received along the direction of the main lobe and echo waves received along the directions of the grating lobes to form images of the sections separately; and combining the images of the sections to display an image of the visual field.

2 Claims, 3 Drawing Sheets

ULTRASONIC DIAGNOSTIC METHOD AND AN ULTRASONIC DIAGNOSTIC APPARATUS FOR CARRYING OUT THE SAME

TECHNICAL FIELD

The present invention relates to an ultrasonic diagnostic method and an ultrasonic diagnostic apparatus and, more specifically, to an ultrasonic diagnostic method that employs grating lobes to enhance real-time performance, to enlarge visual field and to improve S/N ratio, and an ultrasonic diagnostic apparatus for carrying out the ultrasonic diagnostic method.

BACKGROUND ART

In carrying out Doppler color flow mapping (CFM) by the conventional ultrasonic diagnostic apparatus, the pitch p of oscillatory elements and the wavelength $\lambda$ of an ultrasonic sounding wave are determined so as to meet an inequality, $p<\lambda/2$ so that only a main lobe exists in the visual field, i.e., so that no grating lobe exists in the visual field, and the visual field is scanned by the main lobe.

The grating lobe is prevented from existing in the visual field to prevent formation of a virtual image by the grating lobe.

Although not directly related to the present invention, because the grating lobe is different from the side lobe, a technique of preventing a virtual image attributable to the side lobe is disclosed in Japanese Patent Laid-open (Kokai) No. 61-11030.

In the Doppler CFM by the ultrasonic diagnostic apparatus, the real-time performance can be enhanced by increasing the frame rate F, the visual field can be enlarged by increasing the number N of sound rays, and the S/N ratio can be improved by increasing the pulse repetition frequency P.

However, since the relation between the frame rate F, the number N of sound rays, the pulse repetition frequency (the number of successive pulses to cause the phase variation of one sound ray) P, the maximum detection depth Dmax and the sound velocity c is expressed by: $F \times N \times P \times 2D_{max}/c<1$, the increase of the frame rate F, the increase of the number N of sound rays, and the increase of the pulse repetition frequency P contradict each other.

Accordingly, the enhancement of the real-time performance, the expansion of the visual field or the improvement of the S/N ratio, entails inevitably the sacrifice of the visual field or the S/N ratio, the real-time performance or the S/N ratio, or the real time performance or the visual field.

DISCLOSURE OF THE INVENTION

Accordingly, it is an object of the present invention to provide an ultrasonic diagnostic method capable of enhancing real-time performance, enlarging visual field and improving S/N ratio without sacrificing any of real-time performance, visual field and S/N ratio, and to provide an ultrasonic diagnostic apparatus for carrying out the ultrasonic diagnostic method.

In a first aspect of the present invention, an ultrasonic diagnostic method comprises; dividing a visual field into two or more sections; generating sounding waves forming a main lobe and grating lobes to scan the sections of the visual field respectively by the main lobe and the grating lobes; separately processing an echo wave received along the direction of the main lobe and echo waves received along the directions of the grating lobes to form images of the sections separately; and combining the images of the sections to display an image of the visual field.

In a second aspect of the present invention, an ultrasonic diagnostic apparatus comprises: an ultrasonic probe; a transmission control means for making the ultrasonic probe generate sounding waves forming a main lobe and grating lobes and scan two or more sections of a visual field by the main lobe and the grating lobes, respectively; a main lobe receiving and processing means having a directivity only in the direction of the main lobe and capable of forming an image of the section scanned by the main lobe; a grating lobe receiving and processing means having directivities only in the directions of the grating lobes and capable of forming images of the sections scanned by the grating lobes; and an image display means for combining the image of the section scanned by the main lobe and the images of the sections scanned by the grating lobes and displaying an image of the visual field.

The ultrasonic diagnostic method and the ultrasonic diagnostic apparatus in accordance with the present invention utilize positively the grating lobes, which have been regarded as disturbances, from grating lobes in the visual field to scan the sections of the visual field (one section/one grating lobe) and scan only one section by the main lobe. The main lobe and the grating lobes are processed separately to form images of the sections, and an image of the visual field is produced from images of the sections in a stage of display.

Since the areas of the sections are smaller than that of the visual field, the number N of sound rays can be reduced without reducing the sound ray density and, consequently, the frame rate F can be increased and the pulse repetition frequency P can be increased; that is, the real-time performance can be enhanced and the S/N ratio can be improved without sacrificing the visual field, or the number N of sound rays can be increased without changing the frame rate F and the pulse repetition frequency P, which enables the expansion of the visual field.

Accordingly, generally, the real-time performance can be enhanced, the visual field can be enhanced, and the S/N ratio can be improved without sacrificing any of the real-time performance, the visual field, and the S/N ratio.

BEST MODE FOR CARRYING OUT THE INVENTION

A preferred embodiment in accordance with the present invention will be described hereinafter with reference to the accompanying drawings. The present invention may be embodied in different forms without departing from the scope thereof and, therefore, the present embodiment is illustrative and not restrictive.

Figure 1:
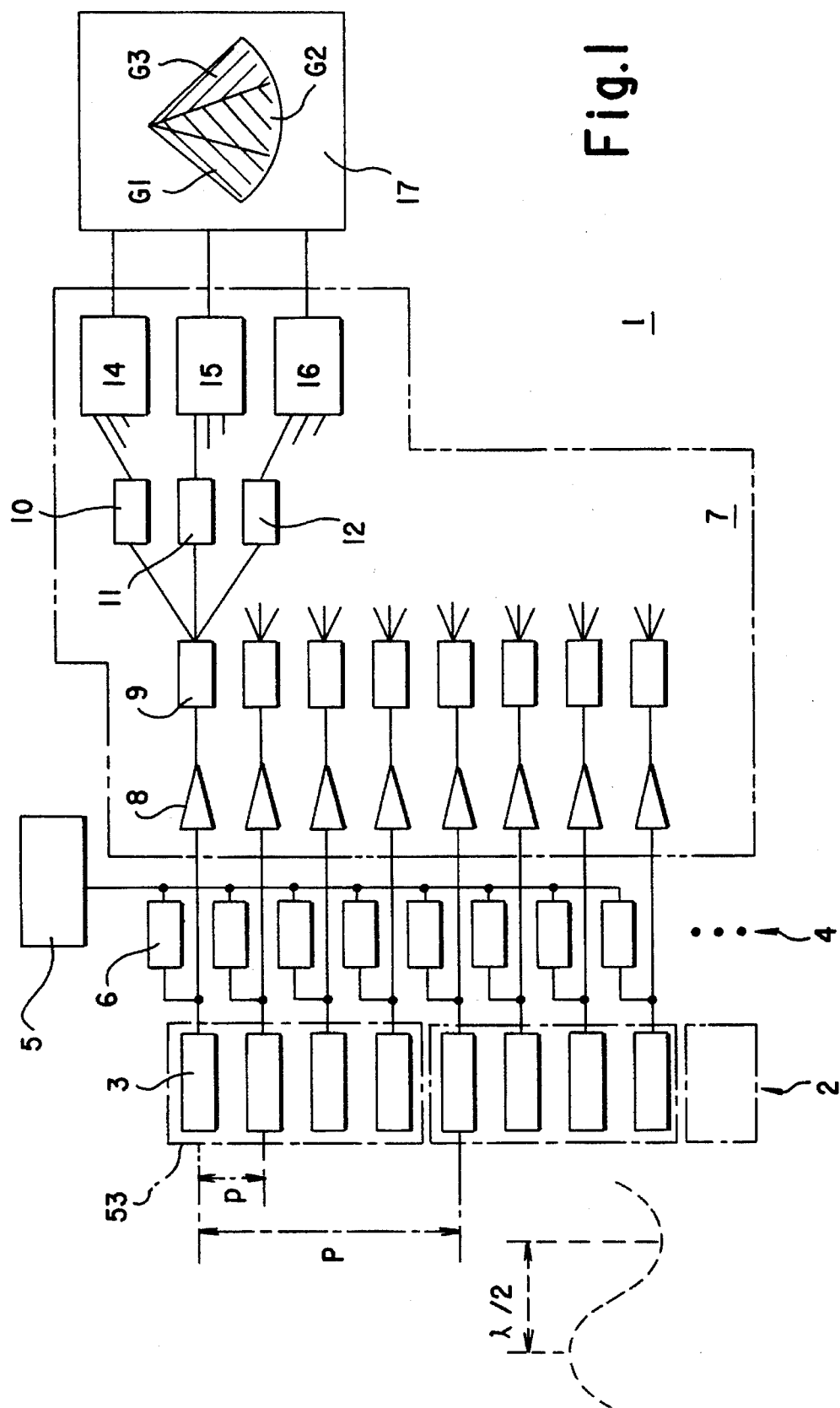
FIG. 1 is a block diagram of an ultrasonic CFM apparatus in a preferred embodiment according to the present invention.

FIG. 1 is a block diagram showing the constitution of an ultrasonic CFM apparatus 1 in a preferred embodiment according to the present invention.

The ultrasonic CFM apparatus comprises an ultrasonic probe 2, a transmission control circuit 4, a receiving and processing circuit 7, and an image display circuit 17.

The ultrasonic probe 2 has an array of, for example, 128 oscillatory elements 3 arranged at a pitch p of, for example, 0.21 mm. The center frequency is 3.5 MHz. Sound wave velocity in a medium through which sound waves are propagated is 1540 m/s.

When all the oscillatory elements 3 send out sounding waves having a wavelength of, for example, 0.44 mm, the relation expressed by $p<\lambda/2$ is satisfied, only a main lobe exists in the visual field, and no grating lobe exists in the visual field.

Figure 2:
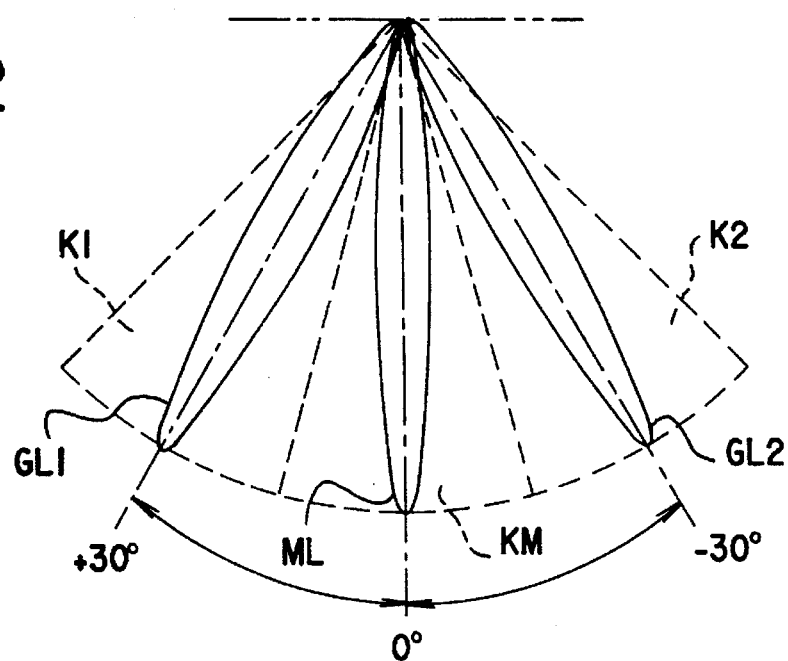
FIG. 2 is a diagrammatic view helpful in explaining a main lobe, a first grating lobe, and a second grating lobe in a wave sending mode.

When every third oscillatory element 3 sends out a sounding wave, the actual pitch P of the oscillatory elements 3 is, for example, 0.84 mm, which is four times the pitch p. Therefore, $P>\lambda/2$ when the wavelength 2 of the wave is 0.44 mm and, as shown in FIG. 2, a first grating lobe GL1 and a second grating lobe GL2 are formed respectively on the opposite sides of a main lobe ML at an angle of 30° to the main lobe ML. Supposing that the angular range of the visual field is 90°, both the main lobe and the grating lobes exist in the visual field.

When the oscillatory elements 3 are divided into groups 53 each of the four successive oscillatory elements 3, and the oscillation of the four successive oscillatory elements 3 is delayed properly relative to each other so that the group is nondirectional, the oscillatory elements 3 of each group 53 function virtually as a single oscillatory element and, consequently, the operation of the ultrasonic probe 2 is equivalent to that of the same in the foregoing mode in which only every third oscillatory element 3 sends out a sounding wave, and a main lobe and grating lobes are formed in the visual field.

The transmission control circuit 4 comprises a sounding wave driving circuit 5 that generates transmission pulses, and a transmission delay circuit 6 that delays the transmission pulses.

The transmission control circuit 4 drives every several oscillatory elements 3 or delays the operation of the oscillatory elements 3 so that the plurality of oscillatory elements 3 function virtually as a single oscillatory element to form a main lobe and grating lobes in the visual field. Furthermore, the operation of the oscillatory elements 3 is delayed for steering to make the main lobe and the grating lobes scan sections of the visual field, respectively. For example, as shown in FIG. 2, a section K1 is allocated to the first grating lobe GL1, a section KM is allocated to the main lobe ML and a section K2 is allocated to the second grating lobe GL2.

The receiving and processing circuit 7 comprises preamplifiers 8, focusing delay circuits 9, first grating lobe extracting delay circuits 10, main lobe extracting delay circuits 11, second grating lobe extracting delay circuits 12, a first grating lobe adder 14, a main lobe adder 15, and a second grating lobe adder 16.

Figure 3:
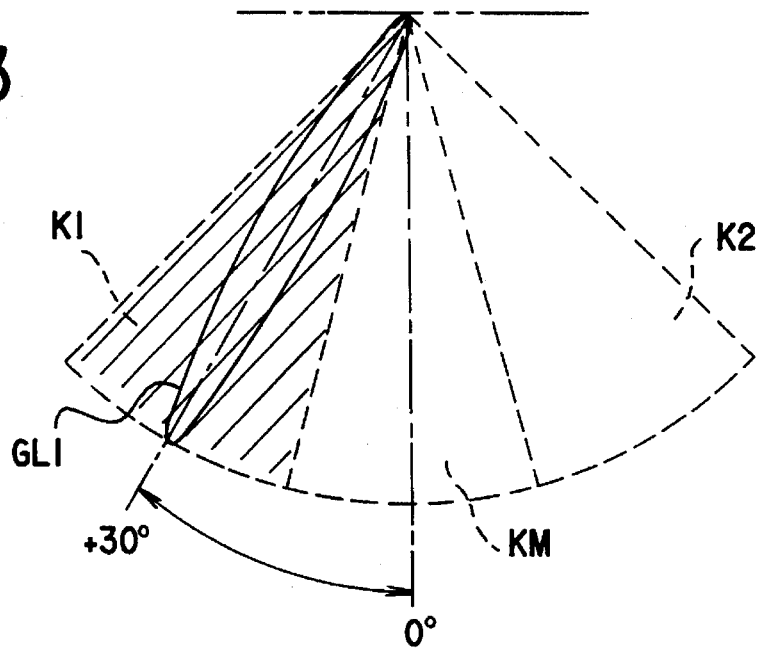
FIG. 3 is a diagrammatic view helpful in explaining a section allocated to a first grating lobe in a wave receiving mode.

The first grating lobe extracting delay circuits 10 are connected with all the oscillatory elements 3, respectively. A delay is determined so that the oscillatory elements have a directivity in the direction of the first grating lobe GL1 shown in FIG. 2. The first grating lobe adder 14 adds up the outputs of all the first grating lobe extracting delay circuit 10. Thus, as shown in FIG. 3, a CFM image G1 (FIG. 1) of the section K1 is formed.

Figure 4:
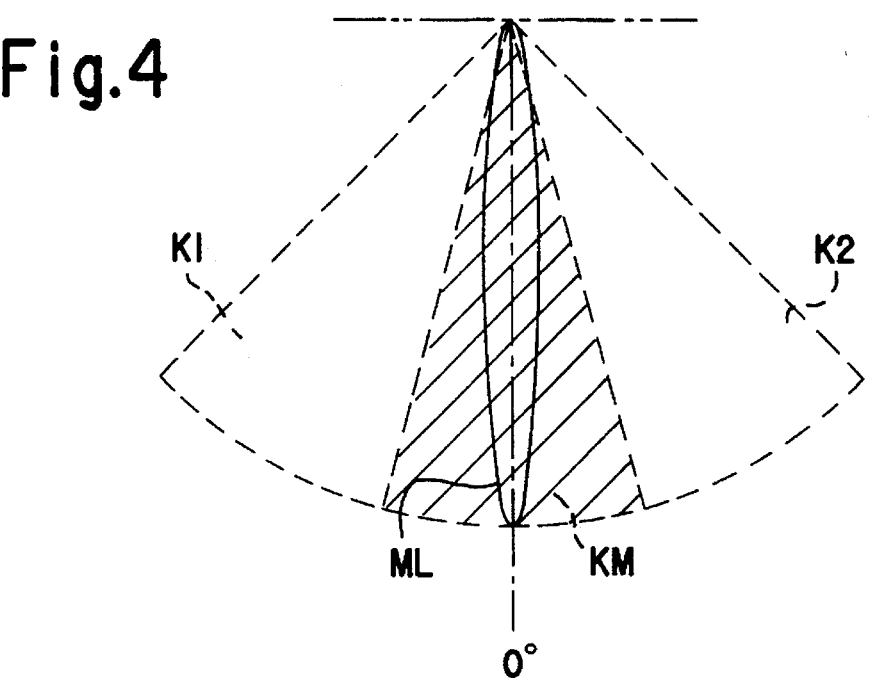
FIG. 4 is a diagrammatic view helpful in explaining a section allocated to a main lobe in a wave receiving mode.

Similarly, as shown in FIG. 4, the main lobe extracting delay circuits 11 and the main lobe adder 15 form a CFM image G2 (FIG. 1) of the section KM.

Figure 5:
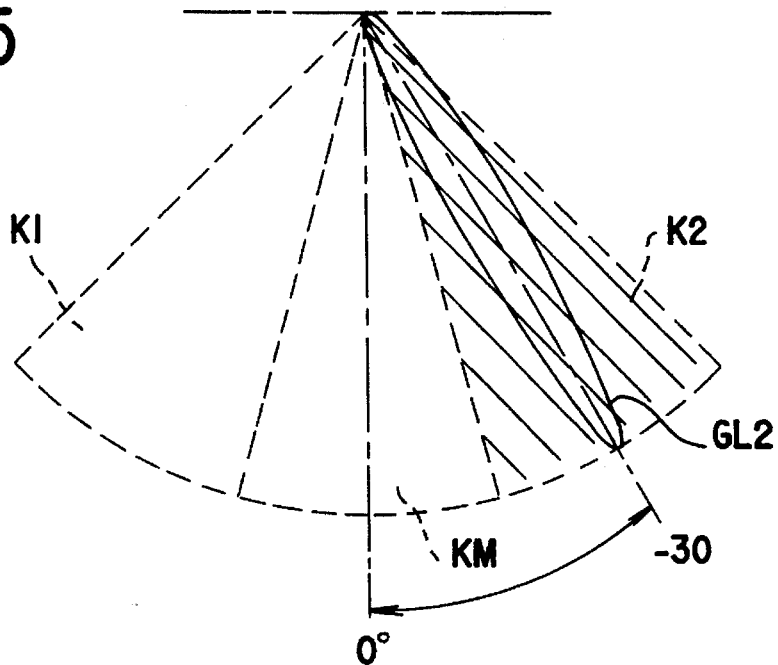
FIG. 5 is a diagrammatic view helpful in explaining a section allocated to a second grating lobe in a wave receiving mode.

Similarly, as shown in FIG. 5, the second grating lobe extracting delay circuits 12 and the second grating lobe adder 16 form a CFM image G3 (FIG. 1) of the section K2.

The image display circuit 17 combines the CFM image G1 of the section K1, the CFM image G2 of the section KM and the CFM image G3 of the section K2 to compose an image as shown in FIG. 1, and displays the composed image on a screen.

The ultrasonic CFM apparatus 1 scans the sections of the visual field respectively by the lobes GL1, ML and GL2, and hence each lobe scans an area ⅓ times an area to be scanned by the lobe by the conventional ultrasonic diagnostic apparatus. Therefore, the number N of sound rays can be reduced without reducing the sound ray density and, consequently, the frame rate F can be increased and the pulse repetition frequency P can be increased; that is, the real-time performance can be enhanced and the S/N ratio can be improved without sacrificing the visual field.

It is also possible to increase the number N of sound rays that can be increased without changing the frame rate F and the pulse repetition frequency P to enlarge the visual field.

The ultrasonic diagnostic apparatus in accordance with the present invention is capable of achieving the enhancement of the real-time performance, the expansion of the visual field, and the improvement of the S/N ratio without sacrificing any of the real-time performance, the visual field, and the S/N ratio.

I claim:

1. An ultrasonic diagnostic method comprising the steps of dividing a visual field into a plurality of sections;

transmitting sound waves to form a main lobe and a pair of grating lobes, with the main lobe located between the pair of grating lobes, and to scan the plurality of sections, respectively, by the main lobe and the pair of grating lobes;

separately processing echo waves received along the direction of the main lobe and echo waves received along the directions of the pair of grating lobes, thereby to form separate images of the respective sections for the received echo waves; and selectively combining the resulting separate images of the respective sections to produce a combined image of the entire visual field, whereby real time performance is improved, visual field is enlarged and signal to noise ratio is improved.

2. An ultrasonic diagnostic apparatus comprising:

an ultrasonic probe;

a transmission control means for causing the ultrasonic probe to generate sound waves forming a main lobe and a pair of grating lobes, with the main lobe located between the pair of grating lobes, and for causing the main lobe and the pair of grating lobes to scan respective sections of a visual field;

a main lobe receiving and processing means for receiving echo waves in a direction of the main lobe and for processing the echo waves to form an image of the section scanned by the main lobe;

a grating lobe receiving and processing means for receiving echo waves in directions of the pair of grating lobes, and for processing the echo waves to form images of the sections scanned by the pair of grating lobes; and an image display means for selectively combining the resulting images of the respective sections scanned by the main lobe and the pair of grating lobes to form a combined image of the entire visual field, and for displaying the combined image of the entire visual field, whereby real time performance is improved, visual field is enlarged and signal to noise ratio is improved.

* * * * *